United States Patent [19]

Asano et al.

[11] Patent Number: 5,044,735

[45] Date of Patent: Sep. 3, 1991

[54] LIQUID CRYSTAL DISPLAY DEVICE FOR PROVIDING SUFFICIENTLY HIGH CONTRAST RATIO AND EXCELLENT RESPONSE TIME

[75] Inventors: Kazuo Asano; Kazuo Arai; Shinichi Nishi, all of Hino, Japan

[73] Assignee: Konishiroku Photo Industry Co., Ltd., Tokyo, Japan

[21] Appl. No.: 529,745

[22] Filed: May 25, 1990

Related U.S. Application Data

[63] Continuation of Ser. No. 935,225, Jan. 26, 1986, abandoned.

[30] Foreign Application Priority Data

Nov. 29, 1985 [JP] Japan .............................. 60-267081
Jul. 1, 1986 [JP] Japan .............................. 61-152663

[51] Int. Cl.$^5$ .................................................. G02F 1/13
[52] U.S. Cl. .................................... 359/75; 359/102; 359/106
[58] Field of Search ............... 350/333, 340, 341, 346, 350/350 R, 347 V, 350 S

[56] References Cited

U.S. PATENT DOCUMENTS

| 4,437,731 | 3/1984 | Sudo et al. | 350/340 |
|---|---|---|---|
| 4,577,930 | 3/1986 | Yang | 350/340 |
| 4,609,255 | 9/1986 | Leenhouts et al. | 350/341 |
| 4,622,162 | 11/1986 | Kimura et al. | 350/350 R |
| 4,634,229 | 1/1987 | Amstutz et al. | 350/341 |
| 4,664,483 | 5/1987 | Van Sprang et al. | 350/350 R |
| 4,678,283 | 7/1987 | Kreuzer et al. | 350/340 |
| 4,697,884 | 10/1987 | Amstutz et al. | 350/341 |

FOREIGN PATENT DOCUMENTS

0107020 3/1985 Japan .

OTHER PUBLICATIONS

White et al, "New Absorptive Mode Reflective Liquid Crystal Display Device", Journal of Applied Physics, vol. 45, No. 11, Nov. 1974, pp. 4718-4723.

Scheffer, Liquid Crystal Display with High Multiplex Rate and Wide Viewing Angle, Japan Display '83, pp. 400-403 (1983).

*Primary Examiner*—Stanley D. Miller
*Assistant Examiner*—Trong Phan
*Attorney, Agent, or Firm*—Finnegan, Henderson, Farabow, Garrett, and Dunner

[57] ABSTRACT

There is disclosed a liquid crystal display device which comprises a liquid crystal material aligned between a pair of substrates each having an oriented layer, characterized in that the following conditions (a) to (d) are satisfied:

(a) the twisted angle of the liquid crystal molecule in the liquid crystal material aligned between the above pair of substrates is 200° to 300°;

(b) the angle created between the director direction of the liquid crystal molecule contacting at least one of the oriented layer surfaces of the above oriented layers and the substrate surface having the oriented layer is not less than 5°;

(c) the following relationship formula (1) is valid between the spontaneous twisting pitch Ps of the liquid crystal molecule and the compulsively twisted pitch Pc of the liquid molecule when the arrangement of liquid crystal molecules is compulsorily regulated by the oriented layers:

$$0 < (Pc - PS)/Pc \leq 0.3 \tag{1}$$

and (d) the following relationship formula (2) is valid between the twisting elastic constant $k_{22}$ and the bending elastic constant $k_{33}$ of the above liquid crystal composition:

$$1.8 < k_{33}/k_{22} < 2.5 \tag{2}$$

11 Claims, 2 Drawing Sheets

LIQUID CRYSTAL DISPLAY DEVICE FOR PROVIDING SUFFICIENTLY HIGH CONTRAST RATIO AND EXCELLENT RESPONSE TIME

This application is a continuation of application Ser. No. 06/935,225 filed Nov. 26, 1986, now abandoned.

BACKGROUND OF THE INVENTION

This invention relates to a liquid crystal display device, particularly to a liquid crystal display device of the twisted nematic type (hereinafter sometimes referred to also as "TN type") which is suitable for a multiplex driving system.

Liquid crystal display devices find applications primarily of the TN type in uses which are now expanding for having such advantages that power consumption is small, that production cost is low, that it can be made lightweight and thin, that it is easily applicable for color display, etc.

A liquid display device of the TN type is constituted by sealing a nematic liquid crystal having a positive dielectric constant anisotropy between two sheets of electrode substrates subjected to orientation treatment, and is generally made under the state in which the liquid crystal molecules are sequentially twisted by 90°.

The liquid crystal display device of this type with a twisted angle of 90° (hereinafter sometimes called also as "90° twisted type") can be produced simply and is suitable for mass production, and also has the advantage of rapid response.

However, the liquid crystal display device of the 90° twisted type has moderate intensity change in the transmitted light (or reflected light) to the change in applied voltage and therefore has such problems as low contrast with sharp images, and also the angle of field of vision is narrow when the time sharing order is made greater in multiplex driving, thus being limited in application for high multiplex driving systems. For example, in a liquid crystal display device with a size of the display picture face of about A4 size, the duty ratio in multiplex driving has been practically preferred to be 1/200 or higher, but said duty ratio in the liquid crystal display device practically applied is about 1/100, with its contrast ratio (ratio of luminance during selection to that during non-selection) being as low as about 3.

As a technique for solving the problems of such a 90° twisted type liquid crystal display device, Japanese Provisional Patent Publication No. 107020/1985 discloses a liquid crystal display device characterized in that the twisted angles of liquid crystal molecules are 180° to 360° and the angle between the director direction of the liquid crystal molecules oriented on at least one of the electrode substrates and the electrode substrates surface (hereinafter sometimes referred to also as "pretilted angle") is greater than 5°. According to this liquid crystal display device, since the intensity change of the transmitted light to the applied voltage is steep, it is stated that a high contrast ratio of 19.6 can be realized in the case of multiplex driving at a duty ratio of, for example, 1/100.

However, in this liquid crystal display device, no sufficient consideration has been paid to the bistable effect and, for this reason, there is the problem that response is slow when the liquid crystal display device is subjected to multiplex driving at a high duty ratio. More specifically, in the liquid crystal cell of this liquid crystal display device, there occurs ordinarily the so-called hysteresis phenomenon in which the intensity change of the transmitted light is different during increasing the applied voltage than that during decreasing of the applied voltage. Due to the bistable effect on account of this phenomenon, there are involved the problems such that the practical voltage range during time sharing driving may be narrowed or the response time for on-off may be elongated. Also as the result of these problems, poor display quality is liable to occur by non-uniformity of the liquid crystal cell thickness, the temperature change, etc. For this reason, it becomes necessary to suppress the bistable effect.

SUMMARY OF THE INVENTION

The present invention has been accomplished in view of the state of the art as described above, and its object is to provide a liquid crystal display device having sufficiently hi contrast ratio and also excellent response characteristics with the time required for on-off being extremely short even in the case of multiplex driving at a high duty ratio.

The liquid crystal display device of the present invention is a liquid crystal display device comprising liquid crystal materials aligned between a pair of substrates each having an oriented layer, characterized in that the following conditions (a) to (d) are satisfied:

(a) The size of the twisted angle of the liquid crystal molecule in the liquid crystal materials aligned between the above pair of substrates is 200° to 300°;

(b) The angle created between the director direction of the liquid crystal molecule contacting at least one of the oriented layer surfaces of the above oriented layers and the substrate surface having said oriented layer (pretilted angle, which is measured by magneto-capacitance null method) is not less than 5°;

(c) The following relationship formula (1) is valid between the spontaneous twisting pitch Ps of the liquid crystal molecule and the regulated twisting pitch Pc of the liquid crystal molecule when the arrangement of liquid crystal molecules is compulsorily regulated by the oriented layers:

$$0 < (Pc - Ps)/Pc \leq 0.3 \ldots \quad (1);$$

(d) The following relationship formula (2) is valid between the twisting modulus constant $k_{22}$ and the bending modulus constant $k_{33}$ of the above liquid crystal materials:

$$1.8 < k_{33}/k_{22} < 2.5 \ldots \quad (2).$$

Further, it is characterized in that (e) the ratio $\Delta\epsilon/\epsilon_\perp$ of the dielectric constant anisotropy $\Delta\epsilon$ of the liquid crystal materials to the dielectric constant $\epsilon_\perp$ in the direction perpendicular to the longer axis direction of liquid crystal molecules is 1.8 or higher.

The liquid crystal display device of the present invention satisfies the above conditions (a) to (d), and therefore, as will be understood from the description of examples as described below, the bistable effect in the liquid crystal cell can be suppressed to a necessary minimum to give a sufficiently high contrast ratio and also to give excellent response characteristics with extremely short time required for on-off even in the case of multiplex driving at a high duty ratio.

According to the present invention, it is practically possible to obtain a liquid crystal display device having the characteristics of a contrast ratio of 13 or higher, and yet a response time of 150 msec or shorter, which is by far superior in performance as compared with a device of the prior art.

Further, by employment of the preferable condition (e), high multiplex driving can be performed sufficiently at a low driving voltage in a liquid crystal display device, whereby it becomes possible to obtain a liquid crystal display device of low cost and small power consumption.

DESCRIPTION OF THE PREFERRED EMBODIMENTS

Figure 1:
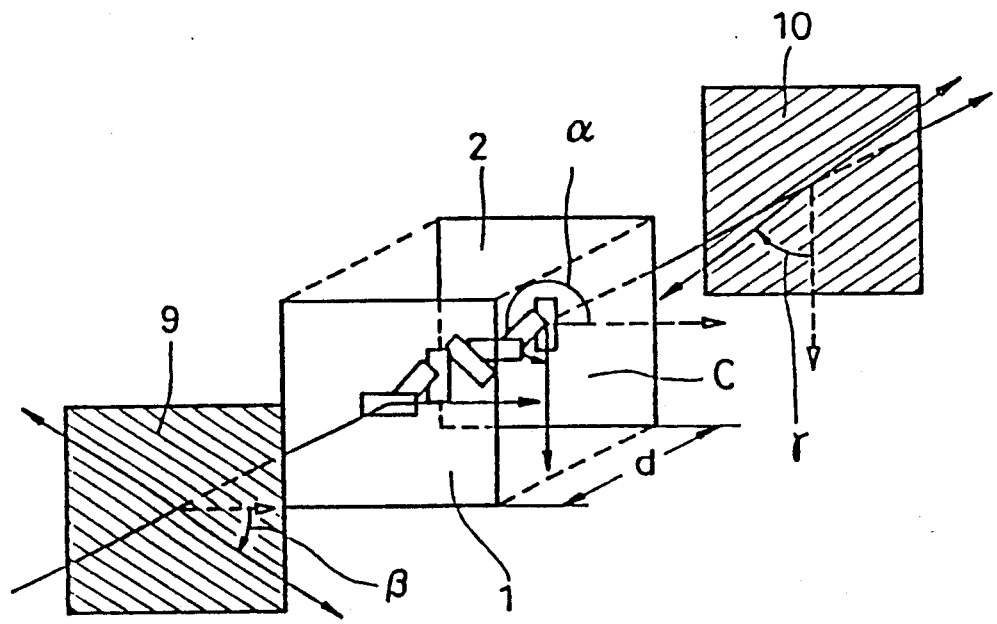
FIG. 1 is a schematic illustration of the present invention.
Figure 2:
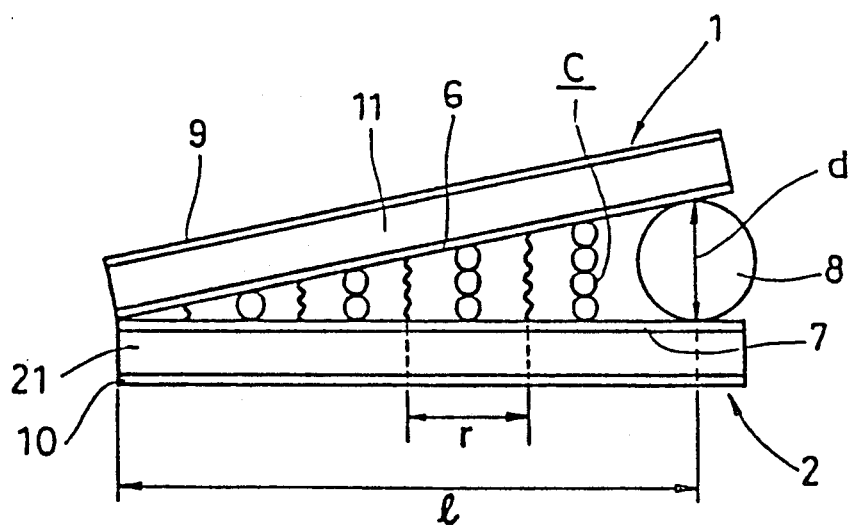
FIG. 2 is an illustration for specifying the spontaneous twisting pitch Ps.

FIG. 1 is a schematic illustration of a liquid crystal display device according to the present invention, of which the pertinent portions are exploded. In FIG. 1, 1 and 2 are substrates having oriented layers (not shown), 9 and 10 polarizing devices and C a liquid crystal layer.

In the present invention, (a) the twisted angle $\alpha$ of the liquid crystal molecules is required to be 200° to 300°, preferably 240° to 290°.

If the twisted angle $\alpha$ is less than 200°, because the intensity change to the applied voltage becomes moderate, no sufficiently high contrast ratio can be obtained and also the angle for field of vision becomes narrower. On the other hand, if the twisted angle $\alpha$ exceeds 300°, although the contrast ratio becomes higher, the time required for on-off becomes longer on the other hand to lower the response characteristic and also disturbance of the orientation of the liquid crystal molecules is liable to occur during change-over of on-off, to result in lowering of display quality.

The twisted angle $\alpha$ can be defined by the direction for orientation treatment for defining the orientation direction of the liquid crystal molecules in the substrate 1 and 2, the kinds and amounts of the nematic liquid crystal constituting the liquid crystal layer C or the optically active substance added thereto, etc.

In FIG. 1, the twisted angle $\alpha$ indicates twisting in the counterclockwise direction with respect to the progressing direction of the incident light, but this is not limitative of the present invention, but said twisting direction may be also clockwise.

In the present invention, (b) the angle between the director direction of the liquid crystal molecules contacting at least one of the oriented layer surfaces of the pair of oriented layers and the substrate surface having said oriented layers (pretilted angle) is required to be 5° or more, preferably 15° or more. Here, the director direction refers to the direction in which the molecular longer axis of the liquid crystal molecule is preferentially oriented If the pretilted angle is less than 5° on either side of the pair of oriented layers, the intensity change of the transmitted light to the applied voltage cannot become steep, and the orientation of the liquid crystal molecules is liable to be disturbed during change-over of on-off, with the result that the display quality is lowered.

In the present invention, (c) the following relationship formula (1) is required to be valid between the spontaneous twisting pitch Ps and the regulated twisting pitch Pc of the liquid crystal molecules when the arrangement of the liquid crystal molecules is compulsorily regulated by the oriented layers:

$$0 < (Pc - Ps)/Pc \leqq 0.3 \ldots \quad (1);$$

When the value of this (Pc−Ps)/Pc is 0 or less, the bistable effect becomes greater in the liquid crystal cell to give a result that, although the contrast ratio may become higher, the time required for on-off becomes longer on the other hand to lower the response characteristic. On the other hand, when the value of (Pc−Ps)/Pc exceeds 0.3, the intensity change of the transmitted light to the applied voltage becomes moderate, whereby no sufficiently high contrast ratio can be obtained and also disturbance of the orientation of the liquid crystal molecules will readily occur during change-over of on-off to lower display quality. Here, spontaneous twisting pitch Ps refers to a pitch in natural twisting of liquid crystal molecules which will occur in the liquid crystal by addition of an optically active substance, etc., into a conventional nematic liquid crystal. More specifically, as shown in FIG. 2, by constituting a liquid crystal cell with arrangement of the substrate 1 and 2 having the oriented layers 6 and 7 respectively thereon in the shape of a wedge on the opposed surfaces of the supporting plates 11 and 21, followed by sealing of a liquid crystal composition into the liquid crystal cell, and measuring the interval r of the stripe pattern (disclination line per ½ pitch) thereby formed on the liquid crystal cell surface, the liquid crystal cell thickness d (thickness of the liquid crystal layer C) and the liquid crystal cell length l, Ps can be determined according to the following formula:

Spontaneous twisting pitch: Ps = 2 dr/l.

In FIG. 2, 8 is a spacer, 9 and 10 are polarizing devices, and the oriented layers 6 and 7 are applied with orientation treatments which are in parallel to each other.

Also, the compulsively twisted pitch Pc is defined according to the following formula by the thickness d of the liquid crystal layer C and the twisted angle $\alpha$ of the liquid crystal molecules defined by the orientation treatment directions of the oriented layers of the substrates 1 and 2 in FIG. 1.

Compulsively twisted pitch: Pc = (360°/$\alpha$) × d.

In the present invention, (d) the following relationship formula (2) is required to be valid between the twisting elastic constant $k_{22}$ and the bending elastic constant $k_{33}$ of the liquid crystal materials:

$$1.8 < k_{33}/k_{22} < 2.5 \ldots \quad (2).$$

In the present invention, elastic constants are measured by the magnetic impression method (Sanpe, Z. Naturforsch, 15a, p. 815 (1960)) and the electroimpression method (Deuling, Mol. Cryst. Liq. Cryst., 19, p. 123 (1972)).

When the value of this $k_{33}/k_{22}$ is less than 1.8, substantially no bistable effect can be obtained, and consequently the intensity change of the transmitted light to the applied voltage becomes moderate so as to give no sufficiently high contrast ratio. On the other hand, when the value of this $k_{33}/k_{22}$ exceeds 2.5, the bistable effect becomes excessive, and consequently the time required for on-off becomes longer to lower the response characteristic, and also disturbance of the liquid crystal orientation in the shape of stripes will readily occur.

The liquid crystal display device of the present invention satisfies the conditions (a) to (d) as described above, and therefore even in the case of multiplex driving with high duty ratio, the intensity change of the transmitted light to the applied voltage can be made steeper to give sufficiently high contrast ratio, and also it has excellent response characteristic with extremely short time required for on-off.

Further, in the present invention, (e) it is preferable that the ratio $\Delta\epsilon/\epsilon\perp$ of the dielectric constant anisotropy $\Delta\epsilon$ to the dielectric constant $\epsilon\perp$ in the direction perpendicular to the longer axis direction of the liquid crystal molecule should be 1.8 or higher. By selecting such a preferable range, sufficient high multiplex driving can be performed with a low driving voltage in a liquid crystal display device, whereby it becomes possible to obtain a liquid crystal display device of low cost and small power consumption.

When the value $\Delta\epsilon/\epsilon\perp$ is excessive, the driving voltage becomes higher and also the intensity change of the transmitted light to the applied voltage becomes moderate, whereby it may become difficult sometimes to obtain sufficiently high contrast ratio.

The dielectric anisotropy $\Delta\epsilon$ of a liquid crystal is a parameter which is decisive for the applicability of certain electro-optical effects (positive dielectric anisotropy for the Freedoricksz effect, twisted nematic cell, cholesteric-nematic phase transition and negative guest-host effect, and negative dielectric anisotropy for the DAP effect, positive guest-host effect and dynamic scattering).

The dielectric anisotropy is defined as the difference of the dielectric constant parallel to the longitudinal axis of the molecule ($\epsilon \parallel$) and the dielectric constant perpendicular to it ($\epsilon\perp$):

$$\Delta\epsilon = \epsilon \parallel - \epsilon\perp.$$

The measurement is carried out with an impedance bridge in a cell having a layer thickness of 50 $\mu$m. By an external magnetic field (magnetic polarization: about 14 kG = 1.4T) the liquid crystal is oriented either parallel or perpendicular to the electric applied. The dielectric anisotropy can be determined at temperatures between $-20°$ and $+90°$ C. at frequencies between 20 Hz and 50 kHz. As a rule, it is quoted for $+20°$ C. and 1 kHz. The driving voltage is 1 volt.

Next, other preferable conditions in preparing practically the liquid crystal display device according to the present invention are to be described.

(i) It is preferred that the liquid crystal composition should comprise a nematic liquid crystal and the transition temperature $T_{NI}$ from the nematic liquid crystal in said liquid crystal materials to an isotropic liquid should be 90° C. or higher.

Thus, by selecting such preferable conditions, it becomes possible to suppress fluctuations in display color, driving voltage, response speed, caused by temperature change within the range of temperatures conventionally used for the liquid crystal display device to reduced levels, whereby a liquid crystal display device with high reliability can be obtained.

(ii) It is preferable that the liquid crystal composition should have a refractive index anisotropy $\Delta n$ which is 0.12 or more.

Thus, by selecting such a preferable condition, the liquid crystal cell can be made thinner, whereby the time required for on-off can be extremely shortened to give a device having further excellent response characteristics.

The refractive index anisotropy (optical anisotropy) $\Delta n$ is the difference of the refractive indices $n_e$ and $n_o$:

$$\Delta n = n_e - n_o.$$

$n_o$ being the refractive index of the ordinary ray or parallel to the longitudinal axis and $n_e$ being the refractive index of the extraordinary ray or perpendicular to the longitudinal axis. The data are evaluated with a Leitz-Jelley microrefractometer, at 20° C. and 589 nm with an accuracy of $\pm 0.003$ units. A Zeiss-Abbe refractometer is available for more precise measurements (iii) The viscosity $\eta$ at a temperature of 20° C. of the liquid crystal materials should preferably be 30 cp or lower.

Thus, by selecting such a preferable condition, the stand-up time in the liquid crystal display device can be made extremely short to give a device with further excellent response characteristics.

Further, in the present invention, the product $\Delta n \cdot d$ of the refractive index anisotropy $\Delta n$ of the liquid crystal layer C and the thickness d ($\mu$m) of the liquid crystal layer C should preferably be 0.4 to 1.5, particularly 0.8 to 1.2. By selecting such a preferable condition, further higher contrast ratio can be obtained, and also the display picture surface can be made lighter.

In FIG. 1, $\beta$ is an angle between the polarizing axis direction of the polarizing device 9 and the director direction of the liquid crystal molecule contacting the surface of the substrate 1, namely the direction in which the molecular longer axis of the liquid crystal molecule is preferentially oriented (provided that it is the director direction projected onto the substrate surface when the liquid crystal molecule has a pretilted angle which is not zero with the substrate surface) (hereinafter sometimes referred to as "deviated angle"), and $\gamma$ is a deviated angle between the polarizing axis direction of the polarizing device 10 and the director direction of the liquid crystal molecule contacting the surface of the substrate 2.

These deviation angles $\beta$ and $\gamma$ should be preferably set at values so that the value of the sum of these angles $\beta + \gamma$ may be within the range of, as the center, $90° \pm 20°$, $-90° \pm 20°$ or $0° \pm 20°$. Further, it is also preferred that the value of the deviated angle $\beta$ should be set at a value within the range of $\pm 15°$ with $(360° - \alpha)/2$ as the center. By setting thus the deviated angles $\beta$ and $\gamma$ at preferable values, the light transmission state can be made lighter, and also the light non-transmission state darker, with the result that the contrast can be further improved Further, in the present invention, in order to stabilize the twisted state of the liquid crystal molecules and prevent formation of aligned portions of liquid crystal molecules having different twisted angles, it is preferred that the following relationship formula should be valid between the thickness d of the liquid crystal layer C and the spontaneous twisted pitch Ps:

$$(\alpha/360) - 0.25 < d/Ps < (\alpha/360) \pm 0.30$$

The means for obtaining a substrate having an oriented layer which can be used in the present invention is not particularly limited, but various means known in the art can be employed. More specifically, it is possible to use a means in which a substance to be vapor deposited such as SiO, MgO, MgF$_2$, etc., is vapor deposited on the substrate surface from an oblique angle to thereby effect the orientation treatment of said substrate surface, a means in which a coating of a polymeric substance such as an imide type, amide type, polyvinyl alcohol type, phenoxy type polymer, etc., is provided on the substrate surface, followed by orientation treatment according to the rubbing method which forms grooves on the surface of the substrate in a certain direction by rubbing the surface of the coating with a cotton cloth, vinylon cloth, Tetoron (trade name) cloth, defatted cotton, etc., or a means in which the surface of the substrate is coated with a carboxylic acid-chromium complex, an organic silane compound, etc., by coating or plasma polymerization, etc., and the liquid crystal molecules are oriented on the substrate by chemical adsorption, or other means.

The liquid crystal materials constituting the liquid crystal layer C which can be used in the present invention may include, for example, the nematic liquid crystals shown below or mixtures of these, etc. However, the present invention is not limited to these.

(1) Cyclohexylcarboxylic acid ester type compounds represented by the following structural formula:

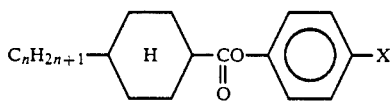

(wherein X represents R (an alkyl group having 1 to 18 carbon atoms, hereinafter the same), OR, CN,

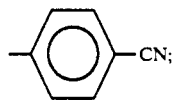

and n is an integer of 1 to 18).

(2) Biphenyl type compounds represented by the following formula:

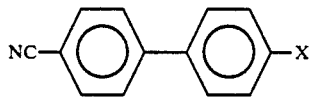

(wherein X represents R, OR,

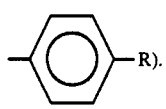

(3) Phenylcyclohexane type compounds represented by the following structural formula:

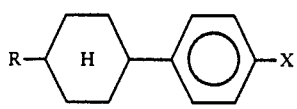

(wherein X represents R, OR, CN,

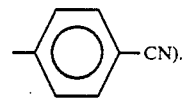

(4) Pyrimidine type compounds represented by the following structural formula:

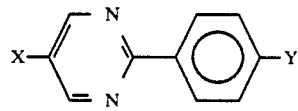

(wherein X represents R, CN,

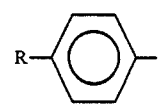

and Y represents R, OR, CN).

(5) Azo type-azoxy type compounds represented by the following structural formula:

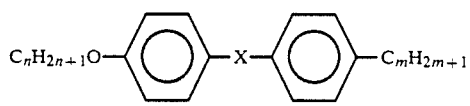

(wherein X represents —N=N—,

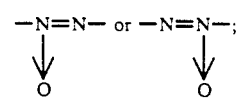

n is an integer of 1 to 9; and m is an integer of 1 to 9).

(6) Benzoic acid ester type compounds represented by the following structural formula:

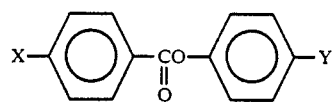

(wherein X represents R, RO,

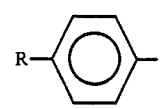

and Y represents R, OR, CN, (7) Trane type compounds represented by the structural formula:

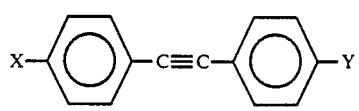

(wherein X and Y each represent F, R, OR,

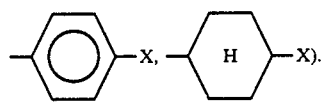

(8) Ethane type compounds represented by the following formula:

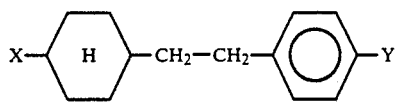

(wherein X and Y each represent R, OR,

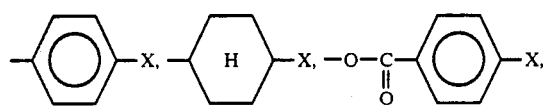

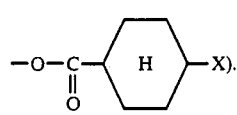

In the liquid crystal materials to be used in the present invention, a smectic liquid crystal component, a cholesteric liquid crystal component, etc., may be also contained, if necessary.

As the optically active substance to be contained in the liquid crystal materials to be used in the present invention, it is possible to use a nematic liquid crystal of the ester type, biphenyl type, phenylcyclohexane type or azo type having the optically active as terminal groups represented by the formulae shown below, which is generally called a chiral nematic liquid crystal.

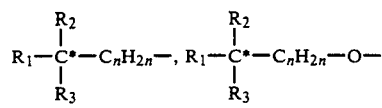

(wherein $R_1$, $R_2$ and $R_3$ are each alkyl groups or a hydrogen atom, and $R_1$, $R_2$ and $R_3$ are different from each other; C* represents asymmetric carbon atom; and n is the same as defined above).

Specifically, for example, the compounds represented by the following structural formulae can be used.

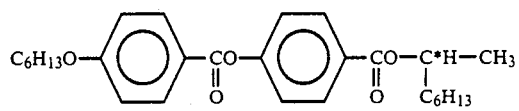

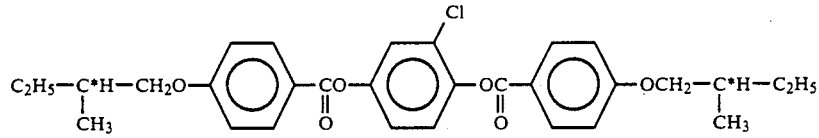

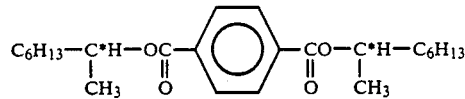

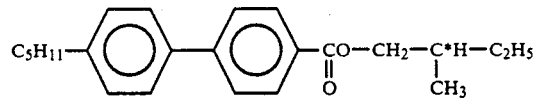

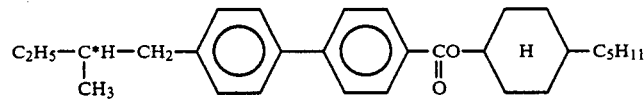

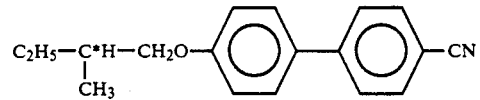

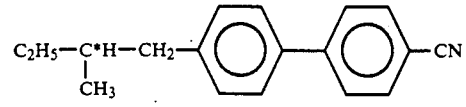

As the optically active substance to be contained in the liquid crystal materials to be used in the present invention, it is possible to use one which can make the spontaneous twisting pitch per unit amount added to the nematic liquid crystal sufficiently short, and by selecting such a substance, the necessary amount of the optically active substance added to the nematic liquid crystal can be kept low, preferably 1.5% by weight or less, whereby lowering in the transition temperature $T_{NI}$ from the nematic liquid crystal to the isotropic liquid caused by, addition of the optically active substance can be kept to a minimum and also the temperature dependency of the spontaneous twisting pitch can be made smaller. Also, in the present invention, for the purpose of decreasing the temperature dependency of the spontaneous twisting pitch, plural kinds of optically active substances having temperature change coefficients of spontaneous twisting pitch of signs opposite to each other may be used.

Figure 3:
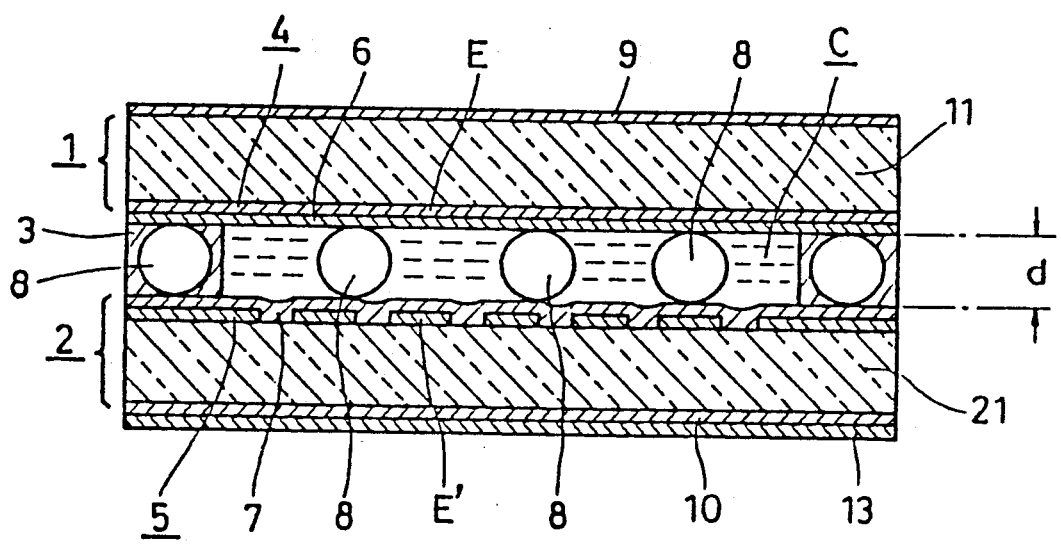
FIG. 3 is a sectional view for illustration of an example of the present invention

In the following, the present invention is described by referring to a specific example. FIG. 3 is a sectional view for illustration, showing an example of the liquid crystal display device according to the present invention. In the liquid crystal display device of this example, two sheets of substrate 1 and 2 are aligned opposed to each other under the state apart from each other, the substrate 1 being constituted by providing an electrode layer 4 and an oriented layer 6 on the surface on the inner side of the supporting plate 11, while the substrate 2 being constituted by providing an electrode layer 5 and an oriented layer 7 on the surface on the inner side of the supporting plate 21. Further, the space between the substrate 1 and the substrate 2 is sealed with a sealing portion 3 to constitute a liquid crystal cell. Internally of the liquid crystal cell, a plural number spacers 8 are aligned under the state apart from each other, with filling of a liquid crystal materials to form a liquid crystal layer C. Also, on the surfaces on the outside of the substrate 1 and the substrate 2, the front polarizing device 9 and the rear polarizing device 10 are provided, respectively. In this Figure, 13 is a reflection plate provided on the surface on the outside of the rear polarizing device 10. In the transmission type liquid crystal display device, no reflection plate 13 may be used.

As the material constituting the above supporting plates 11 and 21, there may be employed glasses such as soda glass, borosilicate glass, quartz glass, etc.; plastic sheets comprising monoaxially stretched polyethylene terephthalate, polyethersulfone, polyvinyl alcohol, etc.; metal sheets comprising aluminum, stainless steel, etc.; and so on. The above electrode layers 4 and 5 may be constituted of transparent electrodes E and E' comprising, for example, ITO (oxides of tin and indium) with a thickness of 1000 Å aligned in parallel to and apart from each other on, for example, the supporting plates 11 and 21 with a thickness of 1.1 mm, the transparent electrode E constituting one electrode layer 4 and the transparent electrode E' constituting the other electrode layer 5 being aligned so as to be mutually perpendicular to each other, whereby an electrode structure for displaying a matrix shape comprising, for example, picture elements of 0.3 mm×0.3 mm.

The above oriented layers 6 and 7 may be constituted of, for example, vapor deposited films with a thickness of 500 Å formed of, for example, SiO as the vapor deposition material by the oblique vapor deposition method (vapor deposition angle: 7° with respect to each of the supporting plates 11 and 21).

The substrates 1 and 2 may be also provided with a dielectric material layer, an alkali ion migration preventive layer, a reflection preventive layer, a polarizing layer, a reflective layer, etc.

The above front polarizing device 9 may be constituted of "F-1205DU" (trade name, produced by Nitto Denko K.K.) and is aligned so that the polarizing axis direction may have a deviation angle $\beta$ of 35° relative to the director direction of the liquid crystal molecules contacting the surface of the oriented layer 6. Similarly, the rear polarizing device 10 and the reflection plate 13 may be constituted of "F-3205M" (trade name, produced by Nitto Denko K.K.), with the polarizing device 10 being aligned so that the polarizing axis direction of the rear polarizing device 10 may have a deviation angle $\gamma$ of 55 relative to the director direction of the liquid crystal molecules contacting the surface of the oriented layer 7.

The above spacer 8 may be constituted by use of a glass fiber "PF-60S" (trade name, produced by Nippon Denki Glass K.K.), and the above seal portion 3 constituted by use of a struct bond "XN-5A-C" (trade name, produced by Mitsui Toatsu Kagaku K.K.).

EXAMPLES

EXAMPLE 1

As the liquid crystal materials constituting the liquid crystal layer C, a material comprising 1.376% by weight of an optically active substance (chiral nematic liquid crystal) "S-811" (trade name, produced by E. Merck Co.) added to a nematic liquid crystal A (this is called "liquid crystal materials 1") was used to prepare a liquid crystal display device having the same constitution as shown in FIG. 3.

The above liquid crystal materials had the following characteristics.

Ratio $k_{33}/k_{22}$ of the bending elastic constant $k_{33}$ to the twisting elastic constant $k_{22} = 2.3$ Ratio $\Delta\epsilon/\epsilon\perp$ of the dielectric constant anisotropy $\Delta\epsilon$ to the dielectric constant $\epsilon\perp$ in the direction perpendicular to the longer axis direction of the liquid crystal molecule $= 2.4$ Transition temperature from nematic liquid crystal to isotropic liquid $T_{NI} = 97.4°$ C.

Refractive index anisotropy $\Delta n = 0.15$

Viscosity at a temperature of 20° C. $\eta = 20$ cp

In the liquid crystal display device with the above constitution, the liquid crystal cell thickness (thickness d of the liquid crystal layer C) was 6.0 µm, the twisted angle $\alpha$ of the liquid crystal molecules was 270° in a counterclockwise direction from the front side, the spontaneous twisting pitch Ps was 7.6 µm, the compulsively twisted pitch was 8.0 µm, and the pitch ratio of these (Pc−Ps)/Pc was 0.05. Also, the angle between the director direction of the liquid crystal molecules contacting the surfaces of the oriented layers 6 and 7 and the surfaces of the substrates 1 and 2 (pretilted angle) are each 35°.

When the test to drive the liquid crystal display device according to a multiplex driving system was conducted, bistable effect was small to give a high contrast ratio, and yet the time required for on-off was extremely short to have excellent response characteristic, and practically a high order time sharing driving with a duty ratio of 1/300 or higher was possible.

Further, this liquid crystal display device was driven according to a multiplex driving system with a duty ratio of 1/100 to determine the contrast ratio and the on-off display response time. As a result, the contrast ratio in the visible light region with wavelength of 400 to 700 nm, namely the ratio of the luminance of the reflected light under the selected state (dark) to that under the non-selected state (light), was found to be as good as 1:15 or higher to give a sharp image with excellent contrast, and also the on-off response time was as short as 150 msec or shorter whereby the display response characteristic was confirmed to be excellent.

EXAMPLE 2

In Example 1, the liquid crystal materials constituting the liquid crystal layer C was changed to a material comprising 1.402% by weight of an optically active substance (chiral nematic liquid crystal) "S-811" (trade name, produced by E. Merck Co.) added to a nematic liquid crystal B (this is called "liquid crystal composition 2"), and the constituent material of the spacer 8 was changed to a glass fiber "PF-70S" (trade name, produced by Nippon Denki Glass K.K.), and following otherwise the same procedure as in Example 1, a liquid crystal display device was prepared.

The above liquid crystal composition 2 had the following characteristics.

Ratio $k_{33}/k_{22}$ of the bending elastic constant $k_{33}$ to the twisting elastic constant $k_{22}=2.0$ Ratio $\Delta\epsilon/\epsilon\perp$ of the dielectric constant anisotropy $\Delta\epsilon$ to the dielectric constant $\epsilon\perp$ in the direction perpendicular to the longer axis direction of the liquid crystal molecule = 2.1

Transition temperature from nematic liquid crystal to isotropic liquid $T_{NI}=91.0°$ C.

Refractive index anisotropy $\Delta n=0.13$

Viscosity at a temperature of 20° C. $\eta n=20$ cp

In the liquid crystal display device with the above constitution, the liquid crystal cell thickness (thickness d of the liquid crystal layer C) was 7.0 μm, the twisted angle α of the liquid crystal molecules was 270° in a counter clockwise direction from the front side, the spontaneous twisting pitch Ps was 8.9 μm, the regulated twisting pitch was 9.3 μm, and the pitch ratio of these (Pc−Ps)/Pc was 0.05. Also, the angle between the director direction of the liquid crystal molecules contacting the surfaces of the oriented layers 6 and 7 and the surfaces of the substrates 1 and 2 (pretilted angle) are each 38°.

When the test to drive the liquid crystal display device according to a multiplex driving system was conducted, bistable effect was small to give a high contrast ratio, and yet the time required for on-off was extremely short to have excellent response characteristic, and practically a high order time sharing driving with a duty ratio of 1/300 or higher was possible.

Further, this liquid crystal display device was driven according to a multiplex driving system with a duty ratio of 1/100 to determine the contrast ratio and the on-off display response time similarly as in Example 1. As a result, the contrast ratio was found to be as good as 1:13 or higher to give a sharp image with excellent contrast, and also the on-off response time was as short as 140 msec or shorter whereby the display response characteristic was confirmed to be excellent.

COMPARATIVE EXAMPLE 1

A liquid crystal display device was prepared in the same manner as in Example 2 except that the liquid crystal material was changed to a material comprising 1.20 wt. % of an optically active substance (chiral nematic liquid crystal) "S-811" (trade name, produced by E. Marck Co.) added to a nematic crystal "ZLI-2116-100" (trade name, produced by E. Merck Co.) (this is called "liquid crystal material 1 for comparison".

The above liquid crystal material 1 for comparison had the following characteristics:

Ratio $k_{33}/k_{22}$ of the bending elastic constant $k_{33}$ to the twisting elastic constant $k_{22}=2.7$ Ratio $\Delta\epsilon/\epsilon\perp$ of the dielectric constant anisotropy $\Delta\epsilon$ to the dielectric constant $\epsilon\perp$ in the direction perpendicular to the longer axis direction of the liquid crystal molecule = 1.12

Transition temperature from nematic liquid crystal to isotropic liquid $T_{NI}=95°$ C.

Refractive index anisotropy $\Delta n=0.12$

Viscosity at a temperature of 20° C. $\eta=19$ cp

In the liquid crystal display device for comparison with the above constitution, the liquid crystal cell thickness (thickness d of the liquid crystal layer C) was 7.0 μm, the twisted angle α of the liquid crystal molecules was 270° in a counter clockwise direction from the front side, the spontaneous twisting pitch Ps was 8.6 μm, the regulated twisting pitch was 9.3 μm, and the pitch ratio of these (Pc−Ps)/Pc was 0.08. Also, the angle between the director direction of the liquid crystal molecules contacting the surfaces of the oriented layers 6 and 7 and the surfaces of the substrates 1 and 2 (pretilted angle) are each 36°.

When the test to drive the liquid crystal display device for comparison according to a multiplex driving system was conducted, bistable effect was small to give a high contrast ratio, but the value of the elastic constant ratio $k_{33}/k_{22}$ was excessively great in the liquid crystal materials, and also the ratio $\Delta\epsilon/\epsilon\perp$ of the dielectric constant anisotropy $\Delta\epsilon$ to the dielectric constant $\epsilon\perp$ was small, whereby the time required for on-off was long to give low response characteristic and a high order time sharing driving with a duty ratio of 1/200 or higher could be performed with difficulty.

Further, this liquid crystal display device was driven according to a multiplex driving system with a duty ratio of 1/100 to determine the contrast ratio and the on-off display response time similarly as in Example 1. As a result, although the contrast ratio was as great as 1:11, the on-off response time was long as 200 msec, thus being inferior as compared with the liquid crystal display device of Examples 1 and 2.

COMPARATIVE EXAMPLE 2

A liquid crystal display device was prepared in the same manner as in Comparative example 1 except a materials comprising 1.395% by weight of an optically active substance (chiral nematic liquid crystal) "S-811" (trade name, produced by E. Merck Co.) added to a nematic liquid crystal "ZLI-3243" (trade name, produced by E. Merck Co.) was used as the liquid crystal materials (this is called "liquid crystal material 2 for comparison").

The above liquid crystal material 2 for comparison had the following characteristics:

Ratio $k_{33}/k_{22}$ of the bending elastic constant $k_{33}$ to the twisting elastic constant $k_{22}=1.6$ Ratio $\Delta\epsilon/\epsilon\perp$ of the dielectric constant anisotropy $\Delta\epsilon$ to the dielectric constant $\epsilon\perp$ in the direction perpendicular to the longer axis direction of the liquid crystal molecule = 2.0

Transition temperature from nematic liquid crystal to isotropic liquid $T_{NI}=65°$ C.

Refractive index anisotropy $\Delta n=0.14$

Viscosity at a temperature of 20° C. $\eta=36$ cp

In the liquid crystal display device for comparison with the above constitution, the liquid crystal cell thickness (thickness d of the liquid crystal layer C) was 7.0 $\mu$m, the twisted angle $\alpha$ of the liquid crystal molecules was 270° in a counter clockwise direction from the front side, the spontaneous twisting pitch Ps was 8.9 $\mu$m, the regulated twisting pitch was 9.3 $\mu$m, and the pitch ratio of these (Pc−Ps)/Pc was 0.05. Also, the angle between the director direction of the liquid crystal molecules contacting the surfaces of the oriented layers 6 and 7 and the surfaces of the substrates 1 and 2 (pretilted angle) are each 35°.

When the test to drive the liquid crystal display device for comparison according to a multiplex driving system was conducted, due to the excessively small value of the elastic constant ratio $k_{33}/k_{22}$ in the liquid crystal materials, no bistable effect could be obtained and therefore the intensity change of the transmitted light to the applied voltage became moderate, whereby sufficiently high contrast ratio could not be obtained. Practically, when the contrast ratio was determined by driving the liquid crystal display device according to a multiplex driving system with a duty ratio of 1/100, it was found to be as small as 1:6 to give no sufficient visual confirmability.

I claim:

1. A liquid crystal display device comprising a liquid crystal layer aligning a liquid crystal material between a pair of substrates, each one of said substrates having an oriented layer, characterized in that the following conditions (a) to (d) are satisfied:
   (a) a twisted angle $\alpha$ of liquid crystal molecules in the liquid crystal layer between said pair of substrates is 200° to 300°;
   (b) an angle created between a director direction of liquid crystal molecules contacting a surface of at least one of said oriented layers and a substrate surface having said oriented layer is not less than 5°;
   (c) the following relationship (1) is valid between a spontaneous twisting pitch Ps of said liquid crystal material and a compulsively twisted pitch Pc of said liquid crystal material when an arrangement of liquid crystal molecules is compulsorily regulated by said oriented layers:

$0<(Pc-Ps)/Pc\leq 0.3 ...$ (1); and (d) the following relationship (2) is valid between a twisting elastic constant $k_{22}$ and a bending elastic constant $k_{33}$ of the liquid crystal material:

$1.8<k_{33}/k_{22}<2.5 ...$ (2).

2. A liquid crystal display device according to claim 1, wherein a ratio $\Delta\epsilon/\epsilon\perp$ of a dielectric constant anisotropy $\Delta\epsilon$ of the liquid crystal material to a dielectric constant $\epsilon\perp$ in a direction perpendicular to a longer axis direction of a liquid crystal molecule is 1.8 or higher.

3. A liquid crystal display device according to claim 1, wherein the liquid crystal material comprises a nematic liquid crystal mixture.

4. A liquid crystal display device according to claim 3, wherein a transition temperature $T_{NI}$ from a nematic liquid crystal phase in said liquid crystal material to an isotropic liquid phase is 90° C. or higher.

5. A liquid crystal display device according to claim 1, wherein the liquid crystal material has a refractive index anisotropy $\Delta n$ of 0.12 or more.

6. A liquid crystal display device according to claim 1, wherein a viscosity $\eta$ at a temperature of 20° C. for the liquid crystal material is 30 cp or lower.

7. A liquid crystal display device according to claim 5, wherein a product $\Delta n \cdot d$ of said refractive index anisotropy $\Delta n$ of said liquid crystal material and a thickness d of said liquid crystal layer is 0.4 to 1.5.

8. A liquid crystal display device according to claim 1, wherein deviation angles $\beta$ and $\gamma$ are set at values so that the value of a sum of these angles $\beta+\gamma$ is within the range of $\pi°\pm 20°$, $-90°\pm 20°$ or $0°\pm 20°$ where $\beta$ is an angle between a polarizing axis direction of one polarizing device and a director direction of liquid crystal molecules contacting a surface of one of said substrates, or a direction in which the molecular longer axis of said liquid crystal molecule is preferentially oriented provided that it is the director direction projected onto said substrate surface when said liquid crystal molecule has a pretilted angle which is not zero with said substrate surface, and $\gamma$ is a deviated angle between a polarizing axis direction of another polarizing device and a director direction of liquid crystal molecules contacting a surface of the other one of said substrates.

9. A liquid crystal display device according to claim 3, wherein said nematic liquid crystal is at least one selected from the group consisting of:
   (1) Cyclohexylcarboxylic acid ester type compounds represented by the following structural formula:

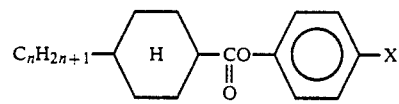

wherein X represents R, OR, CN or

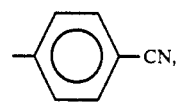

where R represents an alkyl group having 1 to 18 carbon atoms; and n is an integer from 1 to 18,
   (2¹) Biphenyl type compounds represented by the following formula:

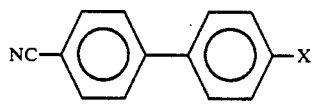

wherein X represents R, OR,

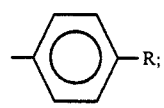

and R is the same as defined above,
   (3) Phenylcyclohexane type compounds represented by the following structural formula:

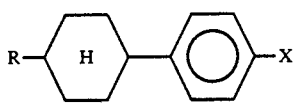

wherein X represents R, OR, CN or

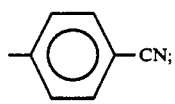

and R is the same as defined above,
(4) Pyrimidine type compounds represented by the following structural formula:

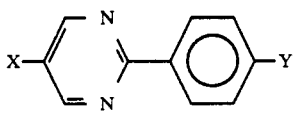

wherein X represents R, CN or

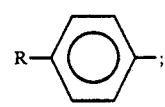

Y represents R, OR or CN; and R is the same as defined above,
(5) Azo type-azoxy type compounds represented by the following structural formula:

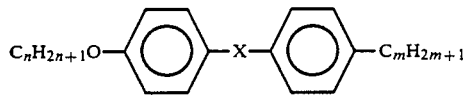

wherein X represents —N=N—,

—N=N— or —N=N—;
 ↓              ↓
 O              O n is an integer of 1 to 9; and m is an integer of 1 to 9,
(6) Benzoic acid ester type compounds represented by the following structural formula:

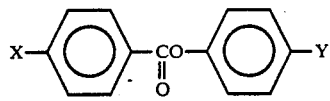

wherein X represents R, RO or

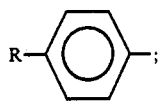

Y represents R, OR, CN or

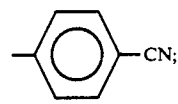

and R is the same as defined above,
(7) Trane type compounds represented by the structural formula:

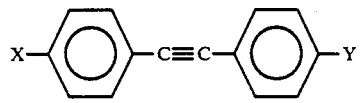

wherein X and Y each represent F, R, or

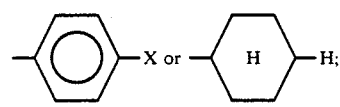

and R is the same as defined above, and
(8) Ethane type compound represented by the following formula:

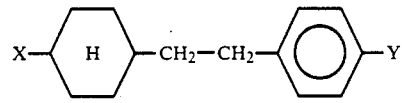

wherein X and Y each represents R, OR,

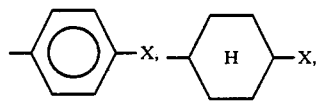

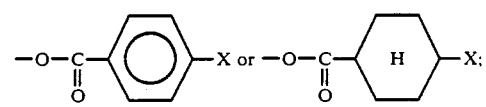

and R is the same as defined above.

10. A liquid crystal display device according to claim 9, wherein the liquid crystal material further contains at least one nematic liquid crystal having an optically active group as the terminal group represented by the following formulae:

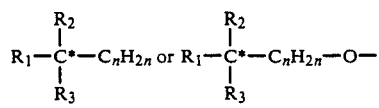

wherein $R_1$, $R_2$ and $R_3$ are each alkyl groups or hydrogen atoms, and $R_1$, $R_2$ and $R_3$ are different from each other; C* represents an asymmetric carbon atom; and n is an integer from 1 to 18.

11. A liquid crystal display device according to claim 8, wherein the deviation angle $\beta$ is set at a value within the range of $\pm 15°$ with $(360° - \alpha)/2$ as the center.

* * * * *